(12) United States Patent
Fischer (10) Patent No.: US 8,894,096 B2
(45) Date of Patent: Nov. 25, 2014

(54) RADIAL FLOW DISC INFLATOR

(71) Applicant: Autoliv ASP, Inc., Ogden, UT (US)

(72) Inventor: Christopher Fischer, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/840,495

(22) Filed: Mar. 15, 2013

(65) Prior Publication Data

US 2014/0265276 A1    Sep. 18, 2014

(51) Int. Cl.
*B60R 21/26* (2011.01)
*B60R 21/261* (2011.01)

(52) U.S. Cl.
CPC .................................. *B60R 21/261* (2013.01)
USPC ........................................ 280/741; 280/740

(58) Field of Classification Search
USPC ................................................. 280/740, 741
See application file for complete search history.

(56) References Cited

U.S. PATENT DOCUMENTS

| | | | |
|---|---|---|---|
| 4,084,839 A | 4/1978 | Takagi et al. | |
| 5,184,846 A | 2/1993 | Goetz | |
| 5,335,940 A | 8/1994 | Cuevas | |
| 5,660,606 A | 8/1997 | Adamini | |
| 7,823,919 B2 | 11/2010 | Jackson et al. | |
| 7,905,516 B2 | 3/2011 | Bostick et al. | |
| 7,926,843 B2 | 4/2011 | Clark et al. | |
| 8,333,154 B2 | 12/2012 | Fukuyama et al. | |
| 8,424,909 B2* | 4/2013 | Kobayashi et al. | 280/741 |
| 8,567,319 B2* | 10/2013 | Ukita et al. | 102/530 |
| 8,585,085 B2* | 11/2013 | Kobayashi et al. | 280/741 |
| 2002/0079681 A1* | 6/2002 | Yamazaki et al. | 280/741 |
| 2003/0127840 A1* | 7/2003 | Nakashima et al. | 280/741 |
| 2003/0145921 A1* | 8/2003 | Blomquist et al. | 149/19.2 |
| 2006/0082113 A1* | 4/2006 | Smith et al. | 280/741 |
| 2007/0046005 A1* | 3/2007 | Hanano et al. | 280/736 |
| 2007/0273132 A1* | 11/2007 | Smith et al. | 280/736 |
| 2009/0108573 A1* | 4/2009 | Schramm | 280/740 |
| 2010/0320735 A1* | 12/2010 | Duvacquier et al. | 280/741 |
| 2012/0326423 A1 | 12/2012 | Hoffman | |

FOREIGN PATENT DOCUMENTS

JP    2012240552    12/2012

* cited by examiner

*Primary Examiner* — Toan To
(74) *Attorney, Agent, or Firm* — Madson IP, P.C.

(57) ABSTRACT

Air bag cushion inflators can include a body including a base member coupled to a diffuser member, the diffuser member including a sidewall with exit ports and a ceiling. A combustion chamber may be positioned within the body and includes a cap with an opening formed therein. A filter element may be positioned in fluid communication with the opening in the combustion chamber cap, and located between the combustion chamber cap and the diffuser member ceiling. The filter element includes at least one barrier and a plurality of apertures positioned to cause inflation gas from the combustion chamber to travel from the opening in the combustion chamber cap to the exit port along a tortuous path including at least one debris pocket and at least one impact region. Methods of forming a filter, and disposing the filter in an inflator body. Other aspects, embodiments, and features are also included.

19 Claims, 6 Drawing Sheets

RADIAL FLOW DISC INFLATOR

TECHNICAL FIELD

The present disclosure relates generally to inflatable airbag cushions for motor vehicles. More specifically, various embodiments of the present disclosure relate to airbag inflators adapted for use in inflatable airbag modules for motor vehicles.

BACKGROUND

Inflatable safety restraint devices, or airbags, are mandated in most new highway vehicles. Airbags are typically included at least in the steering wheel and in the dashboard on the passenger side of a highway vehicle. In addition, such airbags are occasionally installed to inflate beside a vehicle occupant and provide side impact protection, to inflate in front of the legs and protect the knees from forward impact, or to inflate at other strategic locations within the occupant enclosure of a highway vehicle.

In the event of an accident, a collision sensor within the vehicle detects an impact situation and stimulates an inflator to produce pressurized gas. That pressurized gas is directed into an associated airbag cushion, filling the cushion of the airbag, which then prevents a vehicle rider from impacting directly the interior surfaces of the occupant enclosure. The generation of compressed gas occurs in a combustion chamber in the inflator and is commenced typically through the electrical detonation of a small pyrotechnic initiator within the combustion chamber. Inflatable airbag cushions with associated inflators and initiators are usually manufactured together as passenger vehicle safety airbag modules, which are installed unit-wise at appropriate locations in vehicles.

A passenger-side, frontal-impact passenger vehicle safety airbag module is commonly installed behind the instrument panel of a vehicle at an airbag cushion deployment window formed therethrough. The initiator in the inflator of the module is placed in electrical communication with the collision sensor of the vehicle.

Pressurized inflation gas leaving the combustion chamber of an initiator often entrains undesirable particulate debris produced by the pyrotechnic processes in the combustion chamber that gave rise to the inflation gas. This debris can potentially cause damage to the airbag cushion into which the inflation gas is directed. Accordingly, passenger vehicle safety airbag modules routinely make provisions for the removal of such debris from pressurized inflation gas before it leaves the inflator and enters the cushion of the airbag in the module. For example, many airbag modules make use of a filter pack through which the expanding gases travel before filling the airbag cushion. Such filter packs can prevent particulate from leaving the inflator, and can remove heat from the combustion gases prior to entering the airbag cushion. However, the filter pack typically represents a relatively heavy and expensive component of the inflator. Accordingly, it is desirable to provide one or more alternatives that may be employed in place of a conventional filter pack.

BRIEF SUMMARY

Various embodiments of the present disclosure comprise airbag cushion inflators for use with an airbag module, where the inflator is adapted to filter debris and remove heat from inflation gases generated within the inflator. In one or more embodiments, such an inflator may include a body formed with a base member and a diffuser member. The diffuser member can include a sidewall with an exit port formed therein and a ceiling. A combustion chamber may be positioned within the body, and may include a cap with an opening formed therein. A filter element is disposed in fluid communication with the opening in the combustion chamber cap and positioned between the combustion chamber cap and the diffuser member ceiling. The filter element may include at least one barrier and a plurality of apertures positioned to cause inflation gas from the combustion chamber to travel from the opening in the combustion chamber cap to the exit port along a tortuous path including at least one debris pocket and at least one impact region.

Additional embodiments of the present disclosure comprise inflatable airbag modules. According to one or more embodiments, such modules may include at least one inflatable cushion, and an inflator in fluid communication with the one or more inflatable cushions to provide a supply of inflation gas to the inflatable cushion during deployment. The inflator may include a base member and a diffuser member coupled together to form a body, where the diffuser member includes a sidewall with an exit port formed therein and a ceiling. A combustion chamber may be included to at least substantially enclose a quantity of gas generant. The combustion chamber can include a cap with an opening formed therein. An initiator assembly is coupled to the base member and disposed at least partially within the combustion chamber to be in sufficient communication with the quantity of gas generant to initiate a reaction for producing a supply of inflation gas during deployment. A filter element is located in fluid communication with the opening in the combustion chamber cap and positioned between the combustion chamber cap and the diffuser member ceiling. The filter element may include at least one barrier and a plurality of apertures positioned to cause inflation gas from the combustion chamber to travel from the opening in the combustion chamber cap to the exit port along a tortuous path including at least one debris pocket and at least one impact region.

Other embodiments of the present disclosure comprise methods of forming an airbag cushion inflator. One or more embodiments of such methods may include forming a filter with at least one barrier and a plurality of apertures positioned and configured to direct a flow of inflation gas along a tortuous path including at least one debris pocket and at least one impact region. The filter may be disposed in an inflator body in fluid communication with an opening in a combustion chamber cap, and between the combustion chamber cap and a diffuser member ceiling.

BRIEF DESCRIPTION OF THE SEVERAL VIEWS OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

The illustrations presented herein are, in some instances, not actual views of any particular filters, airbag cushion inflators or inflatable airbag modules, but are merely idealized representations which are employed to describe the present disclosure. Additionally, elements common between figures may retain the same numerical reference designation.

Figure 1:
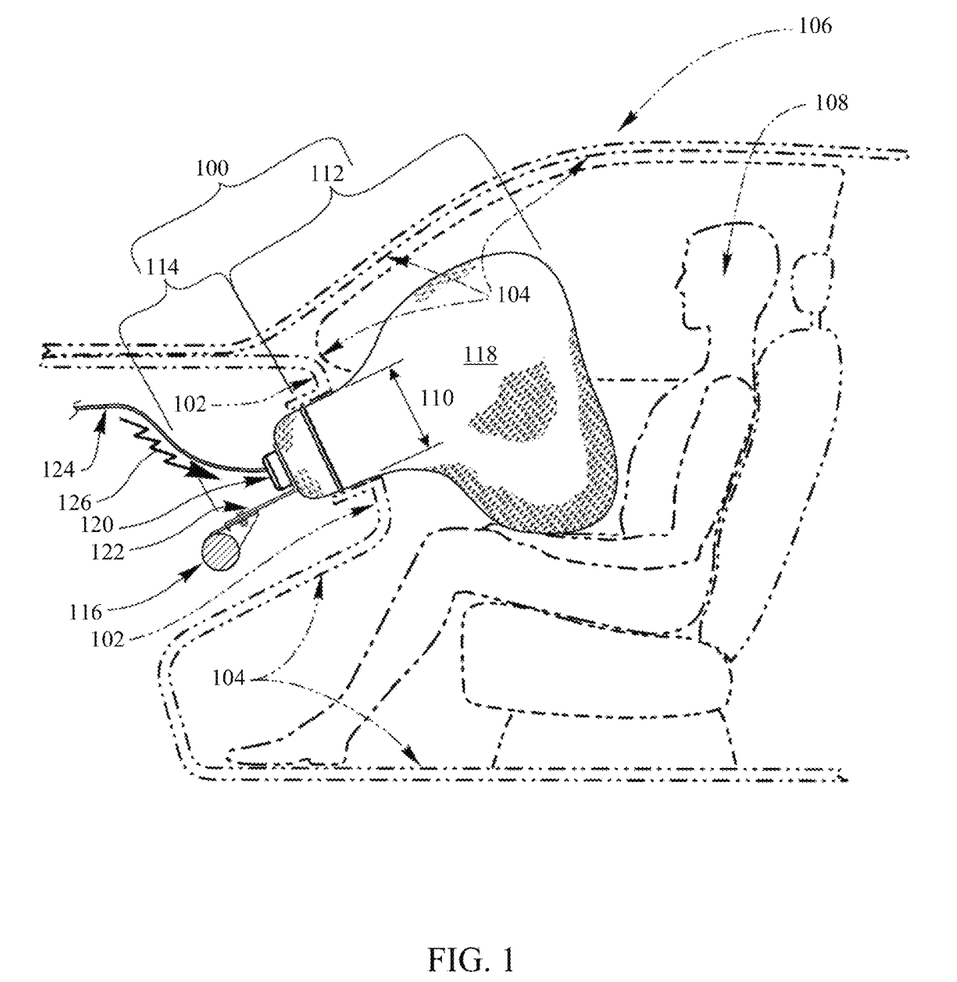
FIG. 1 shows a side view of the interior of a motor vehicle illustrating an inflatable airbag module according to at least one embodiment and showing the airbag as deployed.

Various aspects of the present disclosure include inflators adapted for use with inflatable airbag modules. Such inflatable airbag modules may be employed in various locations within a motor vehicle. For example, FIG. 1 is a side elevation view of an embodiment of a vehicle passenger safety airbag module 100 according to at least one example of the present disclosure. In the depicted example, the airbag module 100 is mounted as a passenger-side, frontal-impact protection feature at the instrument panel 102 of the occupant enclosure 104 of a highway vehicle 106. The airbag module 100 provides protection to a rider 108 seated within the occupant enclosure 104 by precluding, for example, the head or legs of the rider 108 from impacting the interior of the occupant enclosure 104 during a collision involving the vehicle 106.

The airbag module 100 is installed in the vehicle 106 at an airbag deployment window 110 formed through the instrument panel 102. As shown by way of example and not limitation, the airbag module 100 in FIG. 1 is mounted outside of the occupant enclosure 104 in proximity to the deployment window 110. Alternatively, an airbag module, such as the airbag module 100, may be installed in a mounting recess formed in a side of the occupant enclosure 104 that faces the rider 108. In such instances, the mouth of the mounting recess also faces the rider 108 and functions as an airbag deployment window in the same manner as the deployment window 110.

By way of overview, the airbag module 100 includes a deployment section 112 that is secured to instrument panel 102 at the deployment window 110 and an energizer section 114 that is supported independently from the deployment section 112 on a structural element 116 of the vehicle 106. The deployment section 112 includes a gas-inflatable, impact-absorbing cushion 118.

The energizer section 114 of the airbag module 100 is manufactured in inflation communication with the deployment section 112. The energizer section 114 generates and delivers pressurized gas to the deployment section 112, when an impact is imminent between the rider 108 and the occupant enclosure 104. Toward that end, the energizer section 114 includes an inflator 120 incorporating teachings of the present disclosure that produces the pressurized gas for the inflatable cushion 118 and a mounting bracket 122 secured to the inflator 120 by which the inflator 120 is supported from the structural element 116 of the vehicle 106. The inflator 120 may be, for example, a compressed gas inflator, a pyrotechnic inflator, a hybrid inflator, or any other type of device that generates pressurized gas with extreme dispatch. The activation of the inflator 120 is triggered electrically, but indirectly, by way of a pyrotechnic initiator that is not visible in FIG. 1.

An electrical wire 124 is coupled between the initiator of the inflator 120 and the collision sensor for the vehicle 106. When an impact involving the vehicle 106 is occurring or is about to occur, the collision sensor generates an activation signal 126 that is transmitted along the electrical wire 124 to trigger activity in the inflator 120. The inflator 120 then produces an abundance of pressurized inflation gas that is communicated into the deployment section 112 of the airbag module 100, filling the inflatable cushion 118 to capacity and causing the inflatable cushion 118 to extend through the deployment window 110 into the occupant enclosure 104 intermediate the rider 108 and the instrument panel 102 as shown.

Figure 2:
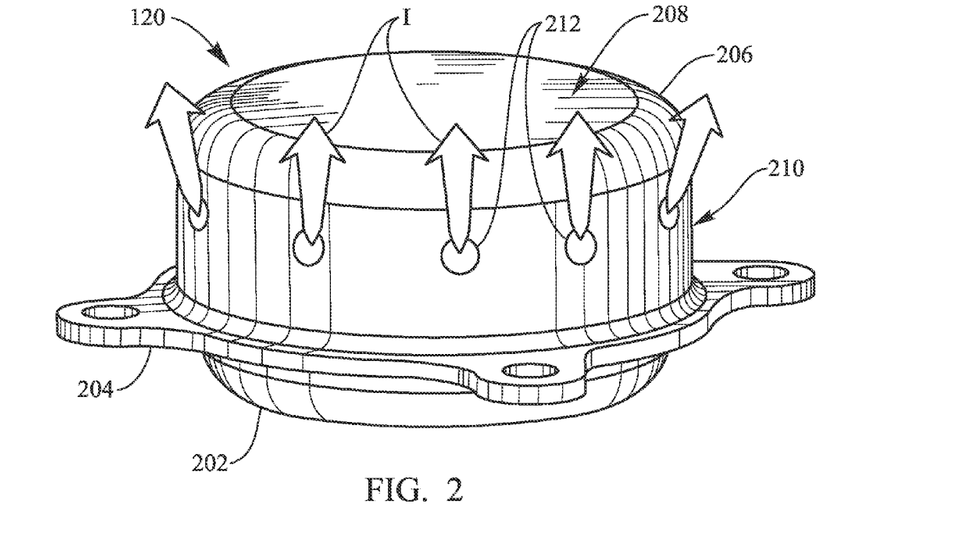
FIG. 2 is an isometric view of an inflator of the energizer section depicted in FIG. 1 according to at least one example of the present disclosure.

FIG. 2 is an isometric view of an inflator 120 of the energizer section 114 of FIG. 1 according to at least one example of the present disclosure. By way of example, the inflator 120 includes a body formed of a base member 202 with an encircling flange 204 joined to a diffuser member 206. The diffuser member 206 has a substantially planar ceiling 208 and a continuous encircling sidewall 210. Through the sidewall 210 are formed a plurality of exit ports 212 from which pressurized inflation gas I emerges from the inflator 120 to fill the inflatable cushion 118 (shown in FIG. 1). The pressurized inflation gas I produced in the inflator 120 is communicated from the inflator 120 to the deployment section 112 of the airbag module 100 shown in FIG. 1, filling the inflatable cushion 118 thereof, which projects through the deployment window 110 into the interior of the occupant enclosure 104.

Whether the inflator 120 is a compressed gas inflator, a pyrotechnic inflator, a hybrid inflator, or any other type of device that generates pressurized gas with extreme dispatch, the production of the inflation gas I is not stimulated directly by the activation signal 126 on the electrical wire 124, as shown in FIG. 1. Instead, the activity of the inflator 120 in producing the inflation gas I is commenced by an igniter that is secured within the base member 202 and the diffuser member 206 of the inflator 120 and is thus not visible in FIG. 2.

According to at least one feature, the inflator 120 of the inflatable airbag module 100 is adapted to operate without a conventional filter pack. Generally speaking, one or more embodiments of inflators 120 of the present disclosure include filters near or adjacent to the ceiling 208 of the diffuser member 206 with at least one barrier and at least one aperture, each positioned to cause inflation gas to travel from a combustion chamber to the exit ports 212 along a tortuous path including one or more debris pockets and/or one or more impact regions.

Figure 3:
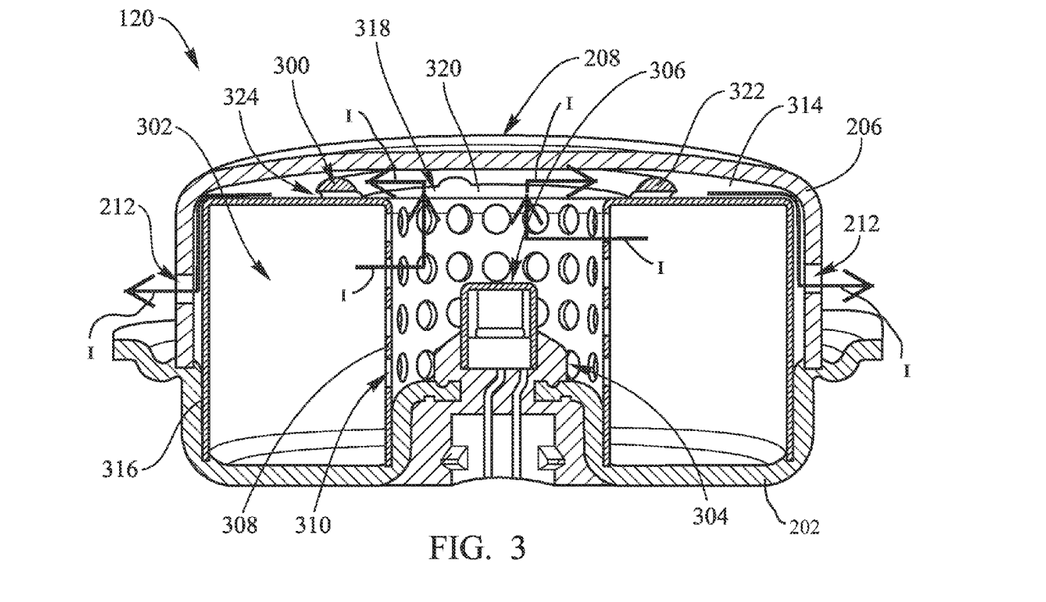
FIG. 3 is a cross-sectional side view of an inflator depicting structural aspects of at least one embodiment of a filter according to at least one example.

FIG. 3 is a cross-sectional side view of an inflator 120 depicting structural aspects of at least one embodiment of a filter 300 according to at least one example. As illustrated, the inflator 120 includes a combustion chamber 302 inside the coupled base member 202 and diffuser member 206. In some examples, elements of the filter 300 may form a portion of the combustion chamber 302. At the center of the combustion chamber 302 is located an igniter assembly 304 with an initiator 306 positioned within an igniter tube 308. The initiator 306 is adapted to initiate a reaction of a gas generant material for producing (e.g., converting the gas generant) a supply of inflation gas during deployment of the inflator 120. For instance, the initiator 306 may, on receipt of an electrical signal, ignite an ignition portion of the initiator 306, resulting in hot ignition gases being expelled from the initiator 306 through apertures 310 in the igniter tube 308 toward gas generant (not shown) in the combustion chamber 302. In some implementations an accelerant may be disposed in firing relation to the initiator 306 to aid in initiating a reaction of the gas generant.

The combustion chamber 302 includes a cap 314 and encircling sidewall 316. The cap 314 may be formed integral with the filter 300 in some examples, or as a separate component from the filter 300 in other examples. The cap 314 includes an opening 318 through which pressurized inflation gas may flow out from the combustion chamber 302. In the depicted example, the opening 318 exposes the combustion chamber 302 to the ceiling 208 of the diffuser member 206. In some embodiments, the opening 318 may be enclosed by a burst disc 320 formed of a rupturable device or other temporary closure device that can be positioned over the opening 318. In some instances, the burst disk 320 may include one or more scored seams to facilitate the rupturing of the burst disk 320 to enable inflation gas to exit the combustion chamber 302.

According to various embodiments, the filter 300 includes an element in fluid communication with the opening 318 and forming a tortuous gas exit path located generally between the cap 314 of the combustion chamber 302 and the ceiling 208 of the diffuser member 206. For instance, in the example of FIG. 3, the filter 300 includes at least one barrier 322 disposed to extend between the cap 314 and the ceiling 208 of the diffuser member 206. The barrier 322 encircles the opening 318 in the cap 314. Once secured in the inflator 120, the barrier 322 of the filter 300, despite having openings, can for convenience be described as enclosing the opening 318. The barrier 322 does nonetheless afford a controlled degree of fluid communication between the opening 318 and the exit ports 212 of the inflator 120, because one or more carefully located apertures 324 is formed through the barrier 322.

The effect of the filter 300 on the outflow of pressurized inflation gas from the combustion chamber 302 in the inflator 120 is to prevent pressurized inflation gas from flowing directly therebetween. Instead, fluid communication is afforded between the combustion chamber 302 and the exit ports 212 only along a tortuous path including one or more debris pockets and/or one or more impact regions.

Figure 4:
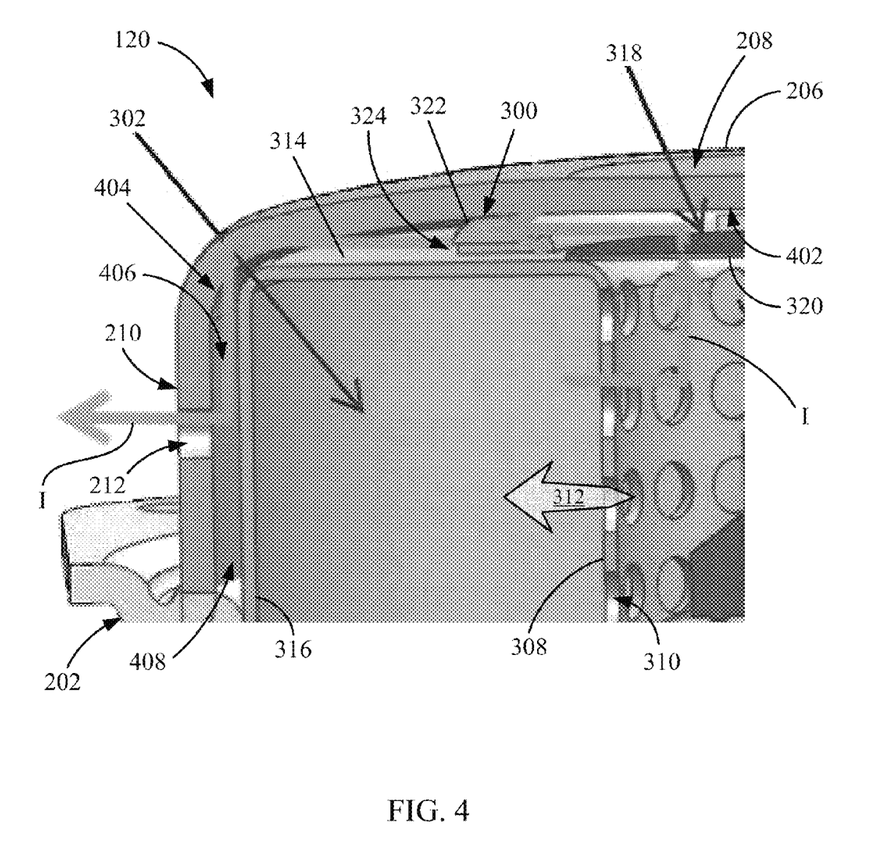
FIG. 4 is a magnified cross-section side view of a portion of the inflator of FIG. 3.

The tortuous path is shown in enhanced detail in the enlarged cross-sectional view of a portion of a single side of the inflator 120 presented in FIG. 4. As noted above, the hot ignition gases 312 may be expelled from the igniter tube 308 through apertures 310 toward gas generant (not shown) in the combustion chamber 302. As the gas generant is ignited, pressurized inflation gas I fills the combustion chamber 302. In this example, the pressurized inflation gas I flows back into the igniter tube 308. That is, instead of flowing radially outward toward the exit ports 212, the inflation gas I flows radially inward into the igniter tube 308. The pressurized inflation gas I can cause the burst disk 320 to rupture if it is not already ruptured. When the burst disk 320 is ruptured, inflation gas I flows axially out of the igniter tube 308 through the opening 318 toward the ceiling 208 of the diffuser 206.

The filtering effect on pressurized inflation gas of this complex flow pattern deserves examination. Initially, inflation gas I passes through opening 318 and is directed straight at the ceiling 208 of the diffuser 206 in what for convenience herein will be described as a substantially perpendicular impact. The inflation gases I then veer from that substantially perpendicular impact making a ninety-degree turn in a radially outward direction between the cap 314 and the ceiling 208 toward the encircling barrier 322, but the momentum of any debris entrained in the inflation gas I brings that debris into a substantially perpendicular impact with a first impact region 402 at the ceiling 208, where debris entrained in the inflation gas I loses momentum and either adheres against the ceiling 208 or may migrate out of the flow of inflation gas back into the igniter tube 308 or against the barrier 322.

The radially-flowing inflation gas makes its way through the various apertures 324 in the barrier 322 directly against the solid sidewall 210 of the diffuser 206. The inflation gas I rapidly changes direction, but the momentum of debris entrained in the pressurized gas flow brings it into impact against a second impact region 404 at the sidewall 210 of the diffuser 206, causing at least some of the debris to adhere to the second impact region 404. The inflation gas I flows into a passageway 406 between the sidewall 316 of the combustion chamber 302 and the sidewall 210 of the diffuser 206. Then, traveling along the passageway 406, the inflation gas I veers in a ninety-degree turn to escape from the inflator 120 through the exit ports 212. The remaining momentum of entrained debris carries the debris downward as oriented in FIG. 4 into a debris pocket 408 between the sidewall 316 of the combustion chamber 302 and the sidewall 210 of the diffuser 206 at the base member 202.

Figure 5:
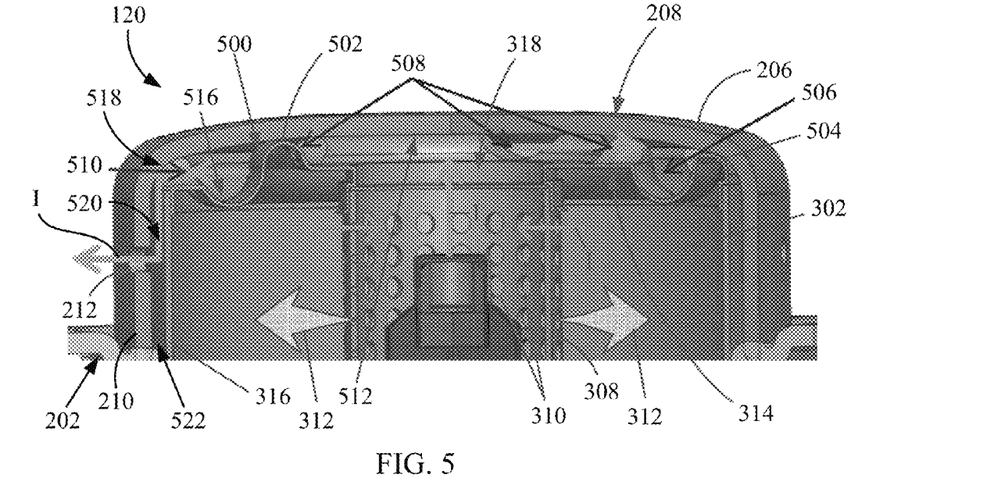
FIG. 5 is a cross-sectional side view of an inflator depicting structural aspects of another embodiment of a filter according to at least one example.
Figure 6:
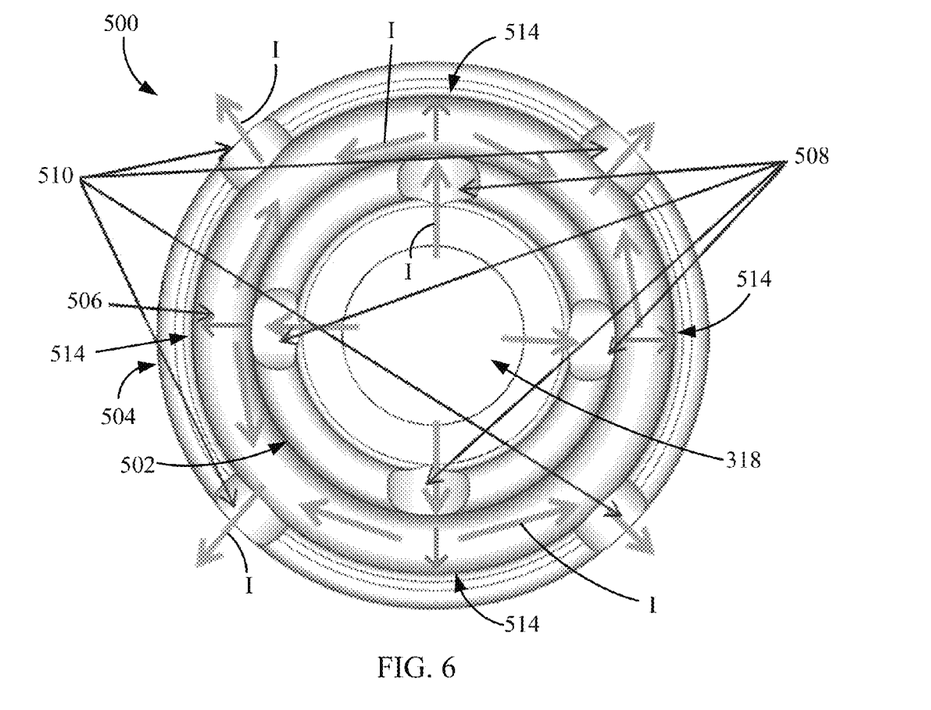
FIG. 6 is a top view of the filter of FIG. 5 according to an example.

Turning to FIG. 5, a cross-sectional side view of an inflator 120 is shown depicting an alternative exemplary filter 500 according to at least one example. Further, FIG. 6 illustrates a top view of the filter 500 according to the example depicted in FIG. 5. Taken together, FIGS. 5 and 6 advantageously depict structural aspects of the embodiment of filter 500.

Similar to the filter 300 in FIGS. 3 and 4, the filter 500 depicted in FIGS. 5 and 6 includes an element in fluid communication with the opening 318 in the cap 314 of the combustion chamber 302, where this element forms a tortuous gas exit path located generally between the cap 314 of the combustion chamber 302 and the ceiling 208 of the diffuser member 206. In this example, the filter 500 forms the cap 314 of the combustion chamber 302. The filter 500 includes a plurality of cylindrical barriers disposed in a coaxial relationship about the opening 318 in the cap 314. For instance, the barriers of the filter 500 include a cylindrical inner barrier 502 encircling the opening 318, and a larger-diameter outer barrier 504 positioned in a substantially coaxial relationship about the inner barrier 502. In a space between the inner barrier 502 and the outer barrier 504 is positioned a trough or trench 506.

Once secured in the inflator 120, the plurality of barriers of the filter 500, despite having openings, can for convenience be described as enclosing the opening 318. The inner barrier 502 and outer barrier 504 do nonetheless afford a controlled degree of fluid communication between the opening 318 and the exit ports 212 of the inflator 120, because one or more carefully located apertures is formed through the barriers. For example, as seen most clearly in FIG. 6, a plurality of first apertures 508 is formed through the inner barrier 502. Similar second apertures 510 are formed at contrasting locations through the outer barrier 504, but these second apertures 510 are positioned in such a manner that the second apertures through the outer barrier 504 of the filter 500 are remote from the first aperture 508 in the adjacent inner barrier 502.

The effect of the filter 500 on the outflow of pressurized inflation gas from the combustion chamber 302 in the inflator 120 is to afford a gas exit path between the combustion chamber 302 and the exit ports 212 only along a tortuous path including one or more debris pockets and/or one or more impact regions. The tortuous path is shown with continued reference to FIGS. 5 and 6. When the inflator 120 is initiated, hot ignition gases 312 may be expelled from the igniter tube 308 through apertures 310 toward gas generant (not shown) in the combustion chamber 302. As the gas generant is ignited, pressurized inflation gas I fills the combustion chamber 302.

In this example, the pressurized inflation gas I flows back into the igniter tube 308. That is, instead of flowing radially outward toward the exit ports 212, the inflation gas I flows radially inward into the igniter tube 308, and axially out of the igniter tube 308 through the opening 318 toward the ceiling 208 of the diffuser 206.

Initially, the inflation gas I passes through the opening 318 and is directed straight at the ceiling 208 of the diffuser 206 in what for convenience herein will be described as a substantially perpendicular impact. The inflation gases I then veer from that substantially perpendicular impact making a ninety-degree turn in a radially outward direction between the cap 314 and the ceiling 208 toward the inner barrier 502, but the momentum of any debris entrained in the inflation gas I brings that debris into a substantially perpendicular impact with a first impact region 512 at the ceiling 208, where debris entrained in the inflation gas I loses momentum and either adheres against the ceiling 208 or may migrate out of the flow of inflation gas I back into the igniter tube 308 or against the inner barrier 502.

As best seen in FIG. 6, the radially-flowing inflation gas I makes its way toward the inner barrier 502 and through the various first apertures 508 in the inner barrier 502 directly against the solid wall of the outer barrier 504. The inflation gases I then veer from that substantially perpendicular impact along the trough 506, but the momentum of any debris still entrained in the inflation gas I brings it into impact against a second impact region 514, where at least some of the entrained debris loses momentum and either adheres against the outer barrier 504 or may migrate out of the flow of inflation gas I into a first debris pocket 516 (best shown in FIG. 5) below the first apertures 508 and second apertures 510 against the trough 506.

Debris still remaining entrained in the pressurized gas flowing in the trough 506 may be driven beyond a second aperture 510 to settle within the first debris pocket 516, while the entraining inflation gas I makes a sharp turn to pass through the second apertures 510. The inflation gas I passing through the second apertures 510 in the outer barrier 504 is driven directly against the solid sidewall 210 of the diffuser 206, depicted in FIG. 5. The inflation gas I rapidly changes direction, but the momentum of debris entrained in the pressurized gas flow brings it into impact against a third impact region 518 at the sidewall 210 of the diffuser 206, causing at least some of the debris to adhere to the third impact region 518. The inflation gas I flows into a passageway 520 between the sidewall 316 of the combustion chamber 302 and the sidewall 210 of the diffuser 206. Then, traveling along the passageway 520, the inflation gas I veers in a ninety-degree turn to escape from the inflator 120 through the exit ports 212. The remaining momentum of entrained debris carries the debris downward as oriented in FIG. 5 into a debris pocket 522 between the sidewall 316 of the combustion chamber 302 and the sidewall 210 of the diffuser 206 at the base member 202.

Figure 7:
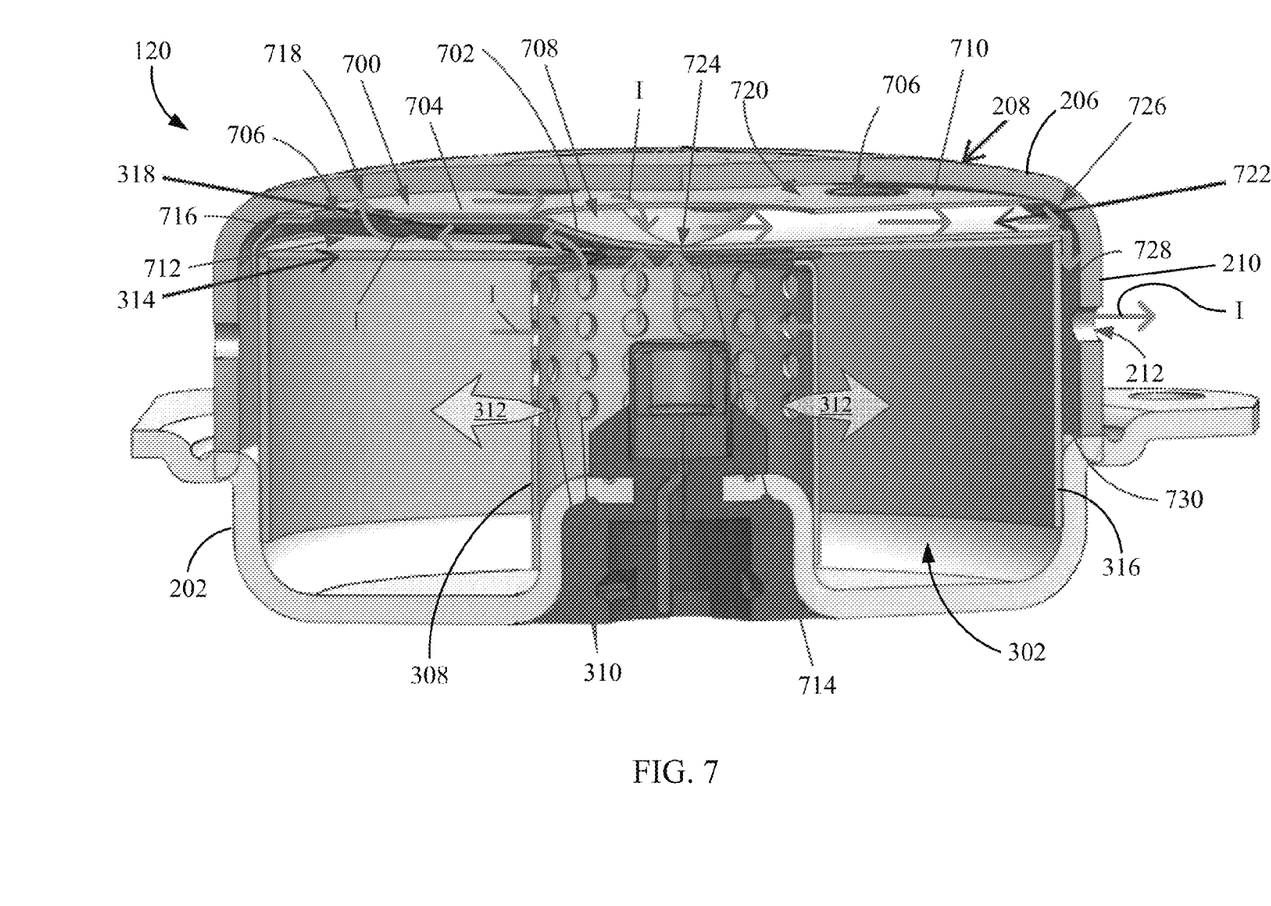
FIG. 7 is a cross-section side view of an inflator depicting structural aspects of another embodiment of a filter according to at least one example.

Turning to FIG. 7, a cross-sectional side view of an inflator 120 is shown depicting a filter 700 according to at least one other example. Similar to the filter 300 in FIGS. 3 and 4 and the filter 500 in FIGS. 5 and 6, the filter 700 depicted in FIG. 7 includes an element in fluid communication with the opening 318 in the cap 314 of the combustion chamber 302, where this element forms a tortuous gas exit path located generally between the cap 314 of the combustion chamber 302 and the ceiling 208 of the diffuser member 206. In this example, the filter 700 may form the cap 314 of the combustion chamber 302. The filter 700 includes a plurality of barriers disposed in an axially offset relationship between the opening 318 in the cap 314 and the ceiling 208 of the diffuser member 206. For instance, the barriers of the filter 700 include a lower barrier 702 positioned above the cap 314 in the orientation of FIG. 7, and an upper barrier 704 positioned between the lower barrier 702 and the ceiling 208 of the diffuser member 206.

Once secured in the inflator 120, the plurality of barriers of the filter 700, despite having openings, can for convenience be described as enclosing the opening 318. The lower barrier 702 and the upper barrier 704 do nonetheless afford a controlled degree of fluid communication between the opening 318 and the exit ports 212 of the inflator 120, because one or more carefully located apertures is formed through the barriers in connection with a plurality of gas flow passageways that are formed by the barriers.

For example, a plurality of axially aligned first apertures 706 are formed in the lower barrier 702 and the upper barrier 704. Further, at least one second aperture 708 is formed through the upper barrier 704, but the second aperture 708 is positioned in such a manner that the second aperture through the upper barrier 704 of the filter 700 is remote from the first apertures 702 in the upper barrier 704 and the adjacent lower barrier 702. By way of example, the plurality of first apertures 706 may be formed through a radially outer portion of the lower barrier 702 and the upper barrier 704, and the second aperture 708 may be formed at a radially inward or radially central location of the upper barrier 704.

The lower barrier 702 and the upper barrier 704 are configured and positioned to form a plurality of passageways. In the example depicted in FIG. 7, the lower barrier 702 has a wave-like configuration. As a result of the wave-like configuration, the lower barrier 702 may include portions that are contiguous to the upper barrier 704 and spaced apart from the cap 314 of the combustion chamber 302, as depicted on the left side in FIG. 7, as well as other portions that are contiguous to the cap 314 and spaced apart from the upper barrier 704, as depicted on the right side in FIG. 7. The effect of the filter 700 including the plurality of apertures and passageways on the outflow of pressurized inflation gas from the combustion chamber 302 in the inflator 120 is to afford a gas exit path between the combustion chamber 302 and the exit ports 212 only along a tortuous path of back-and-forth oppositely-directed gas flow passageways including one or more debris pockets and/or one or more impact regions. The tortuous path is shown with continued reference to FIG. 7.

When the inflator 120 is initiated, hot ignition gases 312 may be expelled from the igniter tube 308 through apertures 310 toward gas generant (not shown) in the combustion chamber 302. As the gas generant is ignited, pressurized inflation gas I fills the combustion chamber 302. In this example, the pressurized inflation gas I flows back into the igniter tube 308. That is, instead of flowing radially outward toward the exit ports 212, the inflation gas I flows radially inward into the igniter tube 308, and axially out of the igniter tube 308 through the opening 318 toward the ceiling 208 of the diffuser 206.

Initially, the inflation gas passes through the opening 318 and is directed at the lower barrier 702 in what for convenience herein will be described as a substantially perpendicular impact. The inflation gases then veer from that substantially perpendicular impact making a sharp turn in a radially outward direction into one of the first passageways 712 formed between the cap 314 and the lower barrier 702, but the momentum of any debris entrained in the inflation gas brings that debris into a substantially perpendicular impact with a first impact region 714 at the lower barrier 702, where debris entrained in the inflation gas loses momentum and may adhere against the lower barrier 702.

Debris still remaining entrained in the pressurized gas flowing in the first passageways 712 may be driven beyond a first aperture 706 to settle within a first debris pocket 716, while the entraining inflation gas I makes a sharp turn to pass through the first aperture 706. The inflation gas I passing through the first apertures 706 in the lower and upper barriers 702, 704 is driven directly against the solid ceiling 208 of the diffuser 206. The inflation gas I rapidly changes direction, but the momentum of debris entrained in the pressurized gas flow brings it into impact against a second impact region 718 at the ceiling 208 of the diffuser 206, causing at least some of the debris to either adhere to the second impact region 718 or to migrate out of the flow of inflation gas I into a second debris pocket on the upper barrier 704, for example between first apertures 706.

The inflation gas then flows radially inward within a second passageway 720 formed between the upper barrier 704 and the ceiling 208 of the diffuser 206. When the inflation gas reaches the second aperture 708, the gas is forced through the second aperture 708 in the upper barrier 704 and against the solid wall of the lower barrier 702. The inflation gases then veer sharply from that substantially perpendicular impact toward one of a plurality of third passageways 722 formed between the lower barrier 702 and the upper barrier 704. Although the inflation gases turn sharply on impacting the lower barrier 702, the momentum of any debris still entrained in the inflation gas brings it into impact against a third impact region 724, where at least some of the entrained debris loses momentum and adheres against the lower barrier 702.

The inflation gas flowing radially outward through the third passageways 722 driven directly against the solid sidewall 210 of the diffuser 206. The inflation gas rapidly changes direction, but the momentum of debris entrained in the pressurized gas flow brings it into impact against a fourth impact region 726 at the sidewall 210 of the diffuser 206, causing at least some of the debris to adhere to the fourth impact region 726. The inflation gas flows into a fourth passageway 728 between the sidewall 316 of the combustion chamber 302 and the sidewall 210 of the diffuser 206. Then, traveling along the fourth passageway 728, the inflation gas veers in a ninety-degree turn to escape from the inflator 120 through the exit ports 212. The remaining momentum of entrained debris carries the debris downward as oriented in FIG. 7 into a third debris pocket 730 between the sidewall 316 of the combustion chamber 302 and the sidewall 210 of the diffuser 206 at the base member 202.

Thus, according to teachings of the present disclosure, it is efficacious to remove entrained debris from a stream of inflation gas leaving an inflator by forcing the inflation gas into several sharp turns, such as turns of ninety (90) degrees, prior to the inflation gas exiting the inflator 120. Each of these turns reduces a temperature of the inflation gas, as well as drops successively more and possibly finer entrained debris along the pathway of the escaping inflation gas. The debris separated from the escaping inflation gas may collect in debris pockets or other locations along the gas exit path. Thus, the mechanisms operating as a filter according to teachings of the present disclosure differ from the mechanisms that operate as a conventional filter that obscures the effective fluid flow cross section for inflation gas with layers of a finely porous or a fibrous material. In apparatus and methods of the present disclosure, the outflow of inflation gas is abruptly redirected on numerous occasions during its passage out of the inflator in which it was generated.

Figure 8:
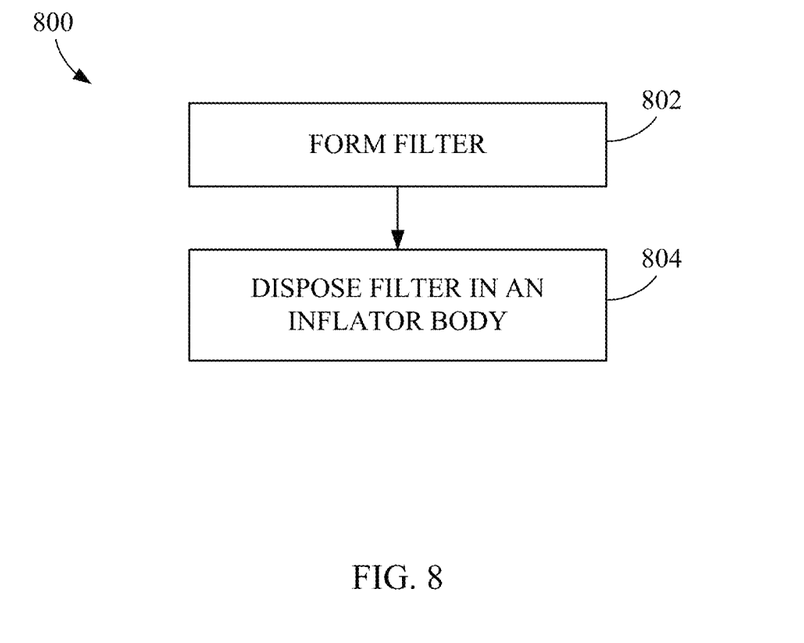
FIG. 8 is a flow diagram illustrating at least one example of a method for forming an airbag cushion inflator.

Further aspects of the present disclosure relate to methods of making an airbag cushion inflator adapted for use with an inflatable airbag module. FIG. 8 is a flow diagram illustrating at least one example of a method for forming an airbag cushion inflator, such as one or more of the inflators described above with reference to FIGS. 1-7. The method 800 includes forming a filter at 802. The filter may be generally formed with at least one barrier and a plurality of apertures positioned and configured to direct a flow of inflation gas along a tortuous gas exit path including at least one debris pocket and at least one impact region.

In one example, the filter may be formed with one or more of the features of the filter 300 described above with reference to FIGS. 3 and 4. By way of example, and with reference to FIG. 3, the filter may be formed to include a cylindrical barrier 322 encircling the opening 318 in the cap 314 of the combustion chamber 302. The cylindrical barrier 322 is sized and configured to extend between the cap 314 and the ceiling 208 of the diffuser member 206. The cylindrical barrier 322 is also formed to include a plurality of apertures 324 formed therein. As described above with reference to FIG. 4, the filter 300 causes inflation gas I from the combustion chamber 302 to travel from the opening 318 to the exit ports 212 in the sidewall 210 of the diffuser member 206 along a tortuous path including at least the debris pocket 408 and the impact region 404.

In another example, the filter may be formed with one or more of the features of the filter 500 described above with reference to FIGS. 5 and 6. By way of example, and with reference to FIGS. 5 and 6, the filter may be formed to include a plurality of cylindrical barriers, such as the inner barrier 502 and the outer barrier 504, disposed in coaxial relationship about the opening 318 in the cap 314 of the combustion chamber 302. Each of these barriers can extend between the cap 314 and the ceiling 208 of the diffuser member 206. The cylindrical barriers 502, 504 also include respective apertures 508, 510 formed therein. Between the cylindrical barriers 502, 504 in the example in FIG. 5 is a trough 506. As described above with reference to FIGS. 5 and 6, the filter 500 causes inflation gas from the combustion chamber 302 to travel from the opening 318 to the exit ports 212 in the sidewall 210 of the diffuser member 206 along a tortuous path including at least the debris pockets 516 and 522 and the impact regions 512, 514, and 518.

In yet another example, the filter may be formed with one or more of the features of the filter 700 described above with reference to FIG. 7. By way of example, and with reference to FIG. 7, the filter may be formed to include a plurality of axially offset barriers, such as a lower barrier 702 and an upper barrier 704. The plurality of axially offset barriers can be positioned and configured to cause inflation gas to travel from the opening 318 in the cap 314 of the combustion chamber 302 along a tortuous path of back-and-forth oppositely-directed gas flow passageways. For instance, a plurality of first passageways 712 may be formed between the lower barrier 702 and the cap 314 of the combustion chamber 302, with each first passageway 712 in fluid communication with the opening 318 in the cap 314 and facilitating a radially-outward flow of inflation gas toward a respective first aperture 706. A second passageway 720 may be formed between the upper barrier 704 and the ceiling 208 of the diffuser 206, with the second passageway 720 in fluid communication with each of the respective first apertures 706 and facilitating a radially-inward flow of inflation gas from the plurality of first apertures 706 toward a second aperture 708. Further, a plurality of third passageways 722 may be formed between the lower barrier 702 and the upper barrier 704, with each third passageway 722 in fluid communication with the second aperture 708 and facilitating a radially-outward flow of inflation gas from the second aperture 708.

As described above with reference to FIG. 7, the filter 700 causes inflation gas from the combustion chamber 302 to travel from the opening 318 to the exit ports 212 in the sidewall 210 of the diffuser member 206 along a tortuous path including at least the debris pockets 716 and 730 and the impact regions 714, 718, 724, and 726.

Referring again to FIG. 8, the filter may be disposed within an inflator body in fluid communication with an opening in a combustion chamber cap, and between the combustion chamber cap and a diffuser member ceiling, at 804. In some instances, the filter may form a portion of the combustion chamber cap.

It is noted, that although the forgoing method 800 is depicted as a flow diagram showing the various steps as a sequential process, many of the forgoing acts can be performed in another sequence, in parallel, or substantially concurrently. In addition, the order of the acts may be re-arranged.

The present features may be embodied in other specific forms without departing from its structures, methods, or other essential characteristics as broadly described herein and claimed hereinafter. The described embodiments and implementations are to be considered in all respects only as illustrative, and not restrictive. The scope of the disclosure is, therefore, indicated by the appended claims, rather than by the foregoing description. All changes that come within the meaning and range of equivalency of the claims are to be embraced within their scope.

What is claimed is:

1. An airbag cushion inflator, comprising:
a body comprising a base member coupled to a diffuser member, the diffuser member comprising a sidewall with an exit port formed therein and a ceiling;
a combustion chamber positioned within the body and comprising a cap with an opening formed therein;
a filter element in fluid communication with the opening in the combustion chamber cap and positioned between the combustion chamber cap and the diffuser member ceiling, the filter element including at least one barrier and a plurality of apertures positioned to cause inflation gas from the combustion chamber to travel from the opening in the combustion chamber cap to the exit port along a tortuous path including at least one debris pocket and at least one impact region.

2. The airbag cushion inflator of claim 1, wherein the filter element comprises a barrier extending between the combustion chamber cap and the ceiling of the diffuser member and encircling the opening in the combustion chamber cap, the barrier including at least one aperture.

3. The airbag cushion inflator of claim 1, wherein the filter element comprises a plurality of cylindrical barriers disposed in a coaxial relationship about the opening in the combustion chamber cap, each barrier of the plurality of barriers comprising at least one aperture forming a gas flow path therein.

4. The airbag cushion inflator of claim 3, wherein the filter element further comprises a trough positioned between at least two barriers of the plurality of barriers.

5. The airbag cushion inflator of claim 1, wherein the filter element comprises a plurality of axially offset barriers between the combustion chamber cap and the diffuser member ceiling.

6. The airbag cushion inflator of claim 5, wherein the filter element comprises:
a lower barrier with a plurality of first apertures formed at a radially outer portion thereof; and
an upper barrier with a plurality of first apertures formed in alignment with the plurality of first apertures of the lower barrier, and a second aperture formed at a radially inward portion thereof.

7. The airbag cushion inflator of claim 5, wherein the filter element comprises a lower barrier with a substantially wavelike configuration.

8. An inflatable airbag module, comprising:
an inflatable cushion; and
an inflator in fluid communication with the inflatable cushion, wherein the inflator comprises:
a base member and a diffuser member coupled together to form a body, wherein the diffuser member comprises a sidewall with an exit port formed therein and a ceiling;
a combustion chamber at least substantially enclosing a quantity of gas generant, the combustion chamber comprising a cap with an opening formed therein;
an initiator assembly coupled to the base member and disposed at least partially within the combustion chamber to be in sufficient communication with the quantity of gas generant to initiate a reaction for producing a supply of inflation gas during deployment; and
a filter element in fluid communication with the opening in the combustion chamber cap and positioned between the combustion chamber cap and the diffuser member ceiling, the filter element including at least one barrier and a plurality of apertures positioned to cause inflation gas from the combustion chamber to travel from the opening in the combustion chamber cap to the exit port along a tortuous path including at least one debris pocket and at least one impact region.

9. The inflatable airbag module of claim 8, wherein the at least one barrier comprises a cylindrical barrier encircling the opening in the combustion chamber cap and extending between the combustion chamber cap and the ceiling of the diffuser member.

10. The inflatable airbag module of claim 8, wherein the at least one barrier comprises a plurality of cylindrical barriers disposed in a coaxial relationship about the opening in the combustion chamber cap, each barrier extending between the combustion chamber cap and the ceiling of the diffuser member.

11. The inflatable airbag module of claim 10, further comprising a trough between at least two barriers of the plurality of barriers.

12. The inflatable airbag module of claim 8, wherein the at least one barrier comprises a plurality of axially offset barriers to cause inflation gas to travel from the opening in the combustion chamber cap to the exit port along a tortuous path of back-and-forth oppositely-directed gas flow passageways formed by the plurality of barriers.

13. The inflatable airbag module of claim 12, wherein the plurality of axially offset barriers comprises a lower barrier and an upper barrier.

14. The inflatable airbag module of claim 12, comprising:
a plurality of first passageways formed between a lower barrier and the combustion chamber cap, each first passageway in fluid communication with the opening in the combustion chamber cap and facilitating a radially-outward flow of inflation gas toward a respective first aperture;
a second passageway formed between an upper barrier and the ceiling of the diffuser member, the second passageway in fluid communication with each of the respective first apertures and facilitating a radially-inward flow of inflation gas from the plurality of first apertures toward a second aperture; and a plurality of third passageways formed between the lower barrier and the upper barrier, each third passageway in fluid communication with the second aperture and facilitating a radially-outward flow of inflation gas from the second aperture.

15. A method of forming an airbag cushion inflator, the method comprising:

forming a filter comprising at least one barrier and a plurality of apertures positioned and configured to direct a flow of inflation gas along a tortuous path including at least one debris pocket and at least one impact region;

disposing the filter in an inflator body in fluid communication with an opening in a combustion chamber cap, and between the combustion chamber cap and a diffuser member ceiling; and wherein forming the filter comprising at least one barrier and a plurality of apertures positioned and configured to direct a flow of inflation gas along a tortuous path including at least one debris pocket and at least one impact region comprises:

forming the filter comprising a cylindrical barrier configured to encircle the opening in the combustion chamber cap, and sized to extend between the combustion chamber cap and the diffuser member ceiling.

16. The method of claim 15, wherein forming the filter comprising at least one barrier and a plurality of apertures positioned and configured to direct a flow of inflation gas along a tortuous path including at least one debris pocket and at least one impact region comprises:

forming the filter comprising a plurality of cylindrical barriers disposed in a coaxial relationship and configured to encircle the opening in the combustion chamber cap, wherein each barrier is sized to extend between the combustion chamber cap and the diffuser member ceiling.

17. The method of claim 16, further comprising:

forming a trough between at least two barriers of the plurality of barriers.

18. The method of claim 15, wherein forming the filter comprising at least one barrier and a plurality of apertures positioned and configured to direct a flow of inflation gas along a tortuous path including at least one debris pocket and at least one impact region comprises:

forming the filter comprising a lower barrier and an axially offset upper barrier, wherein the lower barrier and the upper barrier are configured to be positioned between the combustion chamber cap and the diffuser member ceiling.

19. The method of claim 18, wherein forming the filter comprising the lower barrier and the axially offset upper barrier comprises:

forming a plurality of first passageways configured to be positioned in fluid communication with the opening in the combustion chamber cap, and configured to facilitate a radially-outward flow of inflation gas toward a respective first aperture formed through the lower barrier and through the upper barrier;

forming a second passageway in fluid communication with each of the respective first apertures and configured to facilitate a radially-inward flow of inflation gas from the plurality of first apertures toward a second aperture formed in the upper barrier; and forming a plurality of third passageways between the lower barrier and the upper barrier, each third passageway in fluid communication with the second aperture and configured to facilitate a radially-outward flow of inflation gas from the second aperture.

* * * * *